United States Patent
Douglas (10) Patent No.: US 7,835,113 B1
(45) Date of Patent: Nov. 16, 2010

(54) DEEP DIMPLE STRUCTURE FOR HEAD SUSPENSION COMPONENT

(75) Inventor: Joel B. Douglas, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 843 days.

(21) Appl. No.: 11/553,848

(22) Filed: Oct. 27, 2006

(51) Int. Cl.
G11B 5/48 (2006.01)
(52) U.S. Cl. .................................. 360/245.1
(58) Field of Classification Search .............. 360/245.1, 360/245.5
See application file for complete search history.

(56) References Cited

U.S. PATENT DOCUMENTS

| | | | |
|---|---|---|---|
| 3,968,336 A * | 7/1976 | Johnson | 200/5 A |
| 4,974,633 A * | 12/1990 | Hickey | 137/561 R |
| 4,975,795 A | 12/1990 | Spash | |
| 5,079,660 A | 1/1992 | Yumura et al. | |
| 5,608,590 A | 3/1997 | Ziegler et al. | |
| 6,078,470 A * | 6/2000 | Danielson et al. | 360/245.1 |
| 6,212,760 B1 | 4/2001 | Summers et al. | |
| 6,738,225 B1 * | 5/2004 | Summers et al. | 360/245.2 |
| 2005/0270698 A1 * | 12/2005 | Oh et al. | 360/245.1 |
| 2007/0293866 A1 * | 12/2007 | Stoeckel et al. | 606/72 |

FOREIGN PATENT DOCUMENTS

JP 6-215511 A * 8/1994

* cited by examiner

Primary Examiner—Jefferson Evans
(74) Attorney, Agent, or Firm—Faegre & Benson LLP (57) ABSTRACT

Head suspension offset structures and methods of manufacture. The offset structure includes an offset extending out of a plane of a surface on which it is formed and a plurality of elongated voids and elongated links surrounding the offset. The links extend between the offset and the surface in both radial and circumferential direction. At least a portion of the elongated links and voids extend out of the plane of the surface, minimizing stretching and thinning of the material on and around the offset, and enhancing the integrity of the structure. The offset structure can be formed using conventional manufacturing processes.

35 Claims, 8 Drawing Sheets

FIGURE 6

DEEP DIMPLE STRUCTURE FOR HEAD SUSPENSION COMPONENT

FIELD OF THE INVENTION

The invention relates generally to a head suspension or head suspension component for use in a disk drive. In particular, the invention is a formed offset structure such as a dimple and a method for manufacturing the offset structure.

BACKGROUND OF THE INVENTION

Disk storage devices typically include a head suspension for positioning a head slider in close proximity to a rotating disk. Typical head suspensions include a load beam having a loading region at a distal end thereof, and a flexure interacting with the loading region at the distal end of the load beam. The flexure can be either integral with the load beam or it can be formed as a separate piece rigidly mounted on the load beam. The flexure typically includes a flexure tongue which is a cantilever region having one or more free ends on which the head slider is mounted. The head slider mounting region, i.e., the flexure tongue, is resiliently moveable with respect to the remainder of the flexure in response to the aerodynamic forces generated by the rotating air bearing above the rotating disk.

Head suspensions include a formed offset, such as a dimple, having a convex surface formed on either the load beam or the slider mounting region of the flexure. Such offsets typically serve as lifting points, comb contact points, or load points. Load point dimples, also referred to as pivot point dimples, serve as a load point between the flexure tongue/head slider and the load beam, thereby serving as the pivot point about which the flexure tongue/head slider moves or gimbals in response to the aerodynamic forces. The load point dimple extends between the surface at the distal end of the load beam and the surface of the slider mounting region on the flexure. Accordingly, the load point dimple is formed on the load beam of a head suspension so that its convex surface contacts a surface of the flexure tongue opposite the surface where the head slider is mounted. Alternately, the dimple is formed on a surface of the flexure tongue opposite the surface where the head slider is mounted so that its convex surface contacts the load beam. Load point dimples useful in head suspensions are specifically described in commonly assigned U.S. Pat. Nos. 5,608,590 and 6,078,470, the entirety of which are incorporated herein by reference.

Disk drives are being designed with smaller and thinner head suspensions. A thinner head suspension requires a correspondingly thinner load beam and thinner flexure. A typical offset having a depression and a corresponding dome is commonly formed using devices such as a punch press. As such, the thin material surrounding the base of the offset and the material on the resulting surface of the offset gets stretched during the process. Even during precision forming processes, regions on the surface of the offset and on and around the base of the offset can experience thinning. Such thinning is undesirable because it can, for example, result in fracture of the thin material. There is, therefore, a continuing need for improved offset structures and methods of manufacture. A load point dimple manufactured from thin stock and having structural integrity would be especially desirable.

SUMMARY OF THE INVENTION

The present invention is a disk drive suspension or suspension component having an improved offset. The offset can be manufactured from thin stock and provide structural integrity by reducing stretching and thinning of the material at and around the offset. One embodiment of the offset structure includes an offset extending out of a plane of the surface on which it is formed and a plurality of elongated voids and links surrounding the offset. The elongated links extend in both radial and circumferential directions, connecting the offset to the surface of the component on which the offset is formed.

A method in accordance with one embodiment of the invention for manufacturing the offset includes forming a plurality of elongated voids at spaced locations around an offset area on the component surface. The voids extend between the offset area and the surface in both radial and circumferential directions and are separated from one another by links. An offset is formed out of the plane of the surface at the offset area after forming the voids.

DETAILED DESCRIPTION OF THE PREFERRED EMBODIMENTS

Figure 1:
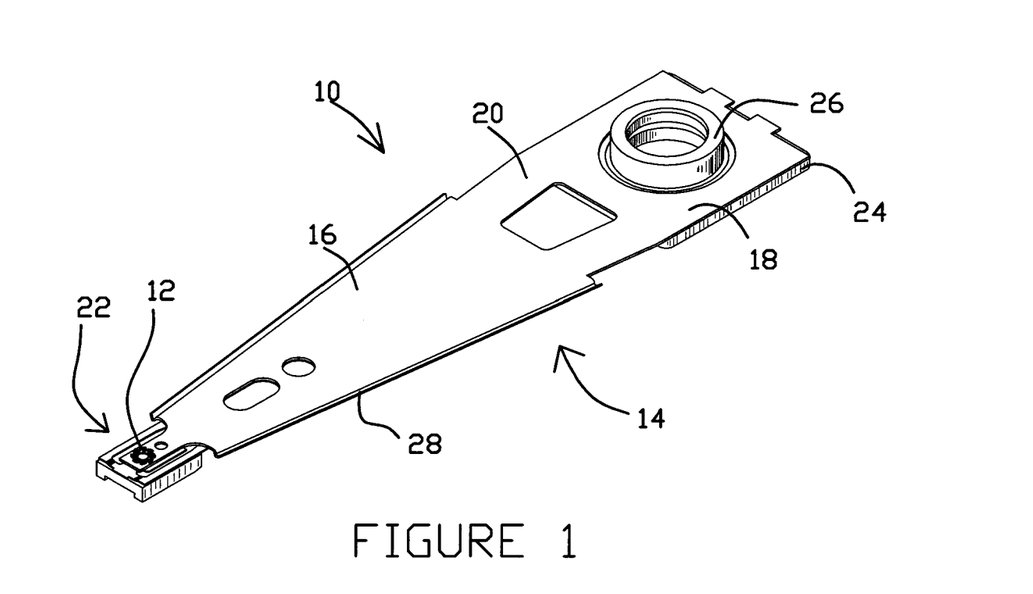
FIG. 1 is an isometric view of a head suspension including an offset structure in accordance with one embodiment of the invention.
Figure 2:
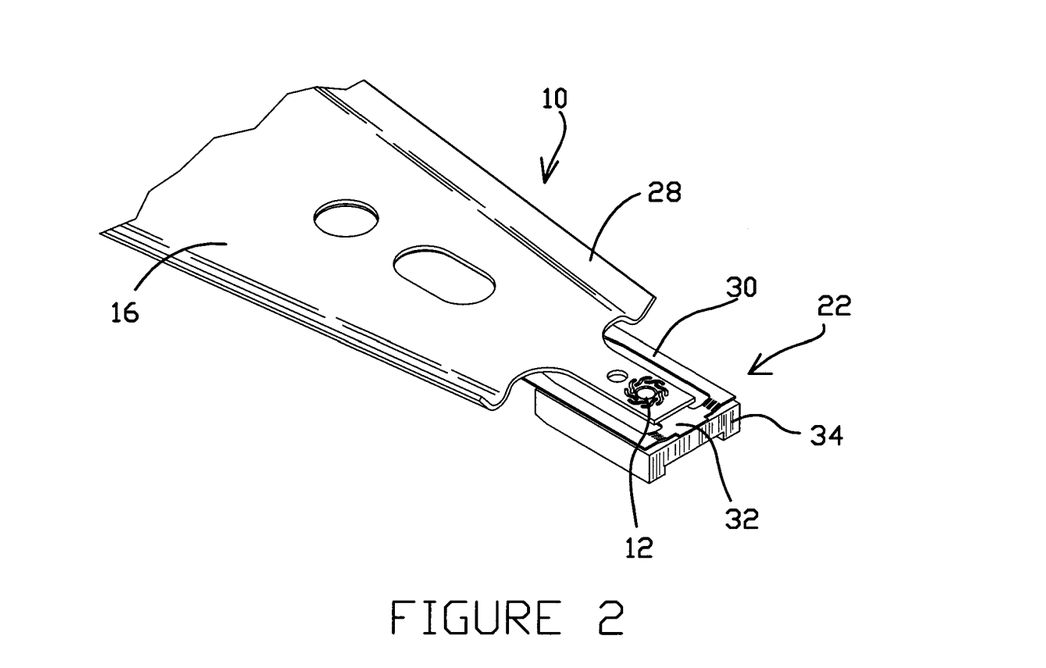
FIG. 2 is a fragmentary view of the head suspension of FIG. 1 showing the offset structure on the loading region of the head suspension.

FIG. 1 shows head suspension 10 having offset structure 12 in accordance with one embodiment of the invention. Head suspension 10 includes load beam 14 having rigid region 16, mounting region 18, spring region 20 between rigid region 16 and mounting region 18, and flexure 22. A base plate 24 having boss tower 26 is mounted to the mounting region 18 of the suspension 10. As perhaps best shown in FIG. 2, load beam 14 also includes longitudinal stiffening rails 28 extending along the two side edges of rigid region 16. Flexure 22 includes arms 30 and a cantilevered slider mounting region 32 having a surface to which head slider 34 is mounted.

Figure 3A:
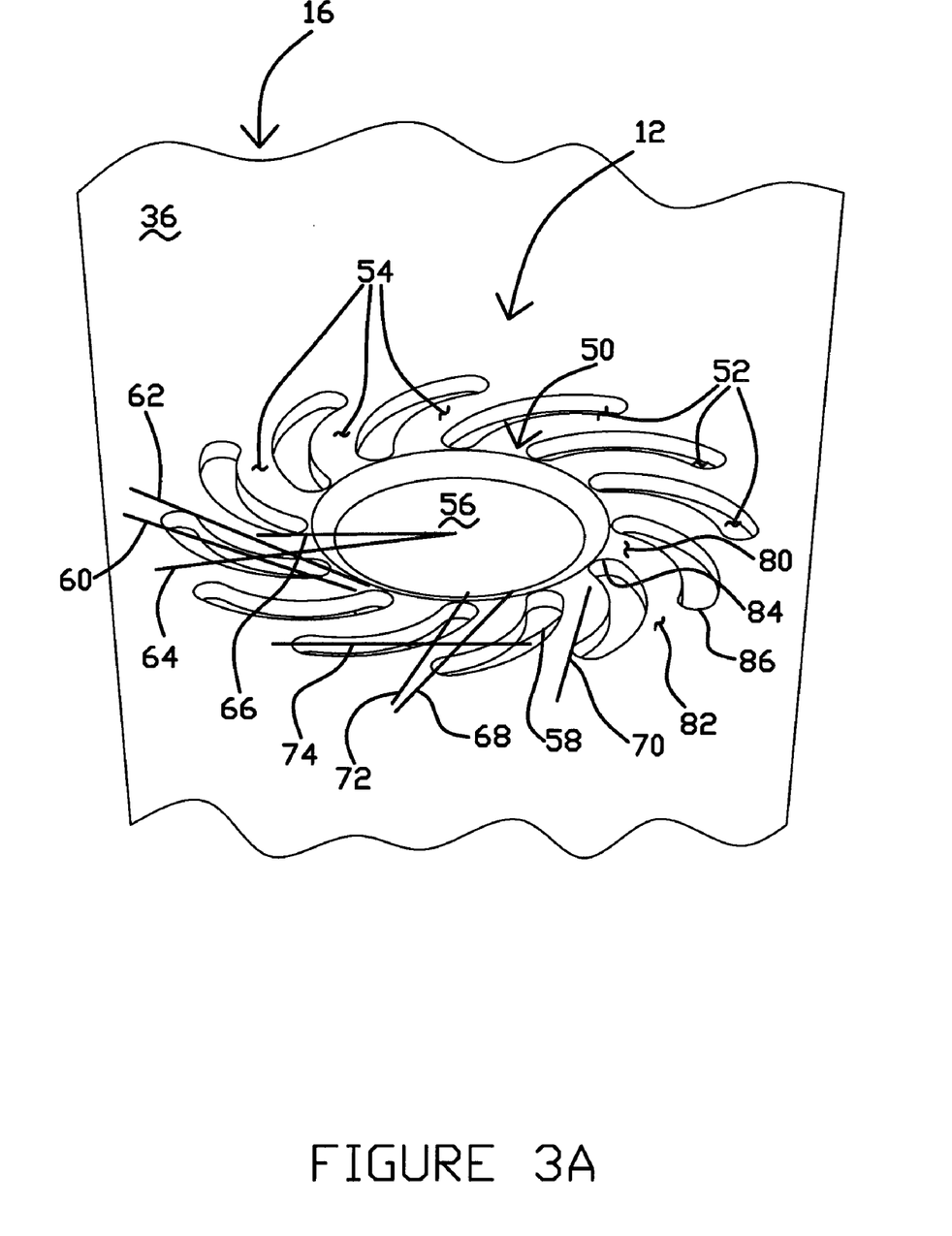
FIG. 3A is a fragmentary isometric view of the load beam surface and offset structure of FIG. 2 showing the depression of the offset.
Figure 3B:
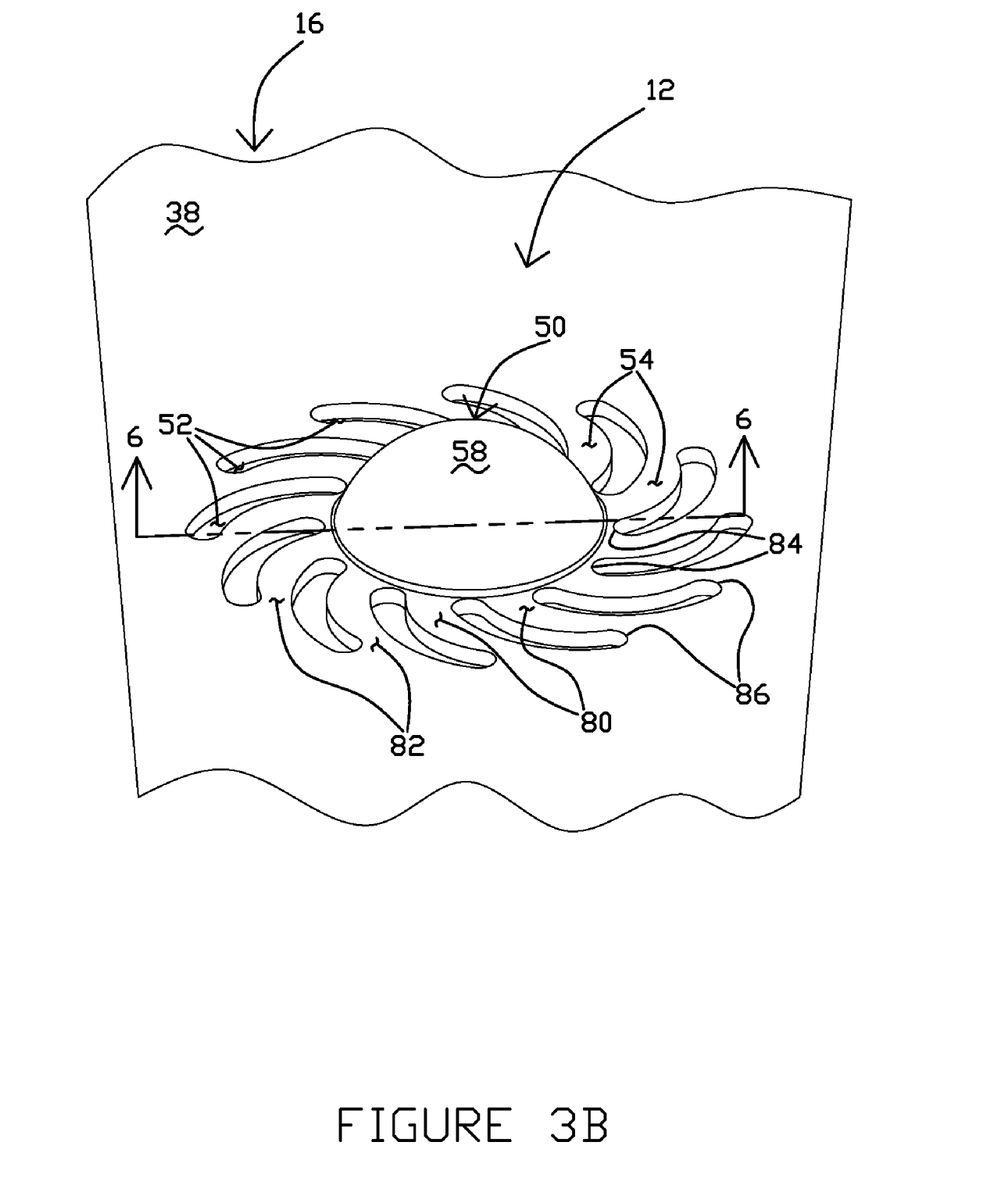
FIG. 3B is a fragmentary isometric view of the load beam surface and offset structure shown in FIG. 2, shown from the side of the load beam opposite the side shown in FIG. 3A.

FIGS. 3A and 3B are detailed illustrations of a circular offset structure 12 on surfaces 36, 38 of rigid region 16 adjacent to slider mounting region 32 of flexure 22. As shown, offset structure 12 includes circular offset 50, a plurality of elongated voids 52 and a plurality of elongated links 54. Offset 50 extends out of the plane of the surrounding surface 38 on which the offset structure 12 is formed. Links 54 are at spaced locations around the offset 50 and connect the offset to the surface 36, 38. As shown, the links 54 extend between the offset 50 and the surface 36, 38 in both radial and circumferential directions. Voids 52 are located between the links 54.

In the illustrated embodiment, the voids 52 and links 54 are generally arcuate structures arranged in a pinwheel form around the offset 50. The voids 52 and links 54 are non-linear in the illustrated embodiment and their longitudinal axes do not intersect one another. A characteristic of these structures is that at least portions of the voids 52 and links 54 have longitudinal axes 60 and 62, respectively, that extend at a non-parallel angle with respect to radial axes 64 and 66, respectively, extending from a center of the offset 50.

Each link 54 has a first end 80 connected to the offset 50 and a second end 82 connected to the surface 36, 38 of rigid region 16. As shown, longitudinal axis 68 through the first end 80 of the links 54 is non-parallel to longitudinal axis 70 through the second end 82 of the links. Similarly, each void 52 has a first end 84 located adjacent to the offset 50 and a second end 86 located adjacent to the surface 36, 38 such that a longitudinal axis 72 through the first end 84 of the void 52 is non-parallel to a longitudinal axis 74 through the second end 86 of the voids. In the illustrated embodiments the voids 52 and links 54 have generally constant widths. In other embodiments (not shown) the widths of the voids 52 and/or links 54 can vary along their lengths. In still other embodiments (not shown) the voids 52 and/or links 54 are linear.

Figure 6:
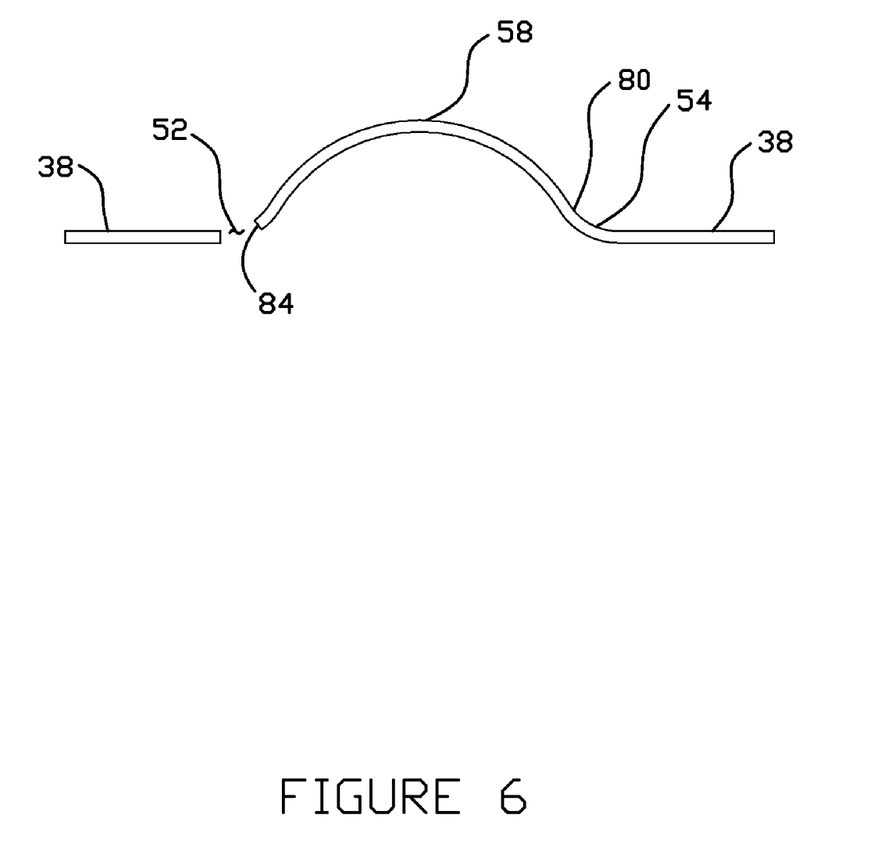
FIG. 6 is a cross section of the offset structure shown in FIG. 3B, taken along line 6-6.

In the embodiment of the invention shown in FIGS. 3A and 3B, circular offset 50 is shown shaped as a dimple having concave depression 56 in a surface 36 of rigid region 16 with corresponding convex dome 58 protruding from the surface 38 of rigid region 16 opposite the surface 36 with depression 56. Dome 58 is shaped generally as a section of a sphere, and extends out of the surface 38 of rigid region 16 toward slider mounting region 34. The dome 58 abuts a surface on slider mounting region 32 opposite the surface on which head slider 34 is mounted. In other embodiments (not shown) the offset 50 extends from the slider mounting region 32 of the flexure 22, and engages surface 38 of the rigid region 16 on the load beam 14. Dome 58 has other shapes (e.g., ovoid or elongated in the vertical or z-height direction) in other embodiments of the invention (not shown). In the illustrated embodiment, voids 52 and links 54 do not intersect the dome 58. In other embodiments (not shown), at least the respective first ends 84 and/or 80 of the voids 52 and/or links 54 intersect the dome 58. At least portions of voids 52 and/or links 54 will typically extend out of the plane of the surface 38 (e.g. as shown in FIG. 6).

Offset structure 12 can be formed using conventional photolithography, etching and mechanical forming processes. In one embodiment, voids 52 are formed in the surface of rigid region 16 using photolithography and chemical etching processes. After the voids 52 are formed, mechanical forming processes including a punch are used to form the dome 58. At least portions of the voids 52 and links 54 will be formed out of the plane of the surface 38 during these forming processes. Other processes can also be used to manufacture offset structure 12. For example, voids 52 can be formed by stamping processes.

Figure 4A:
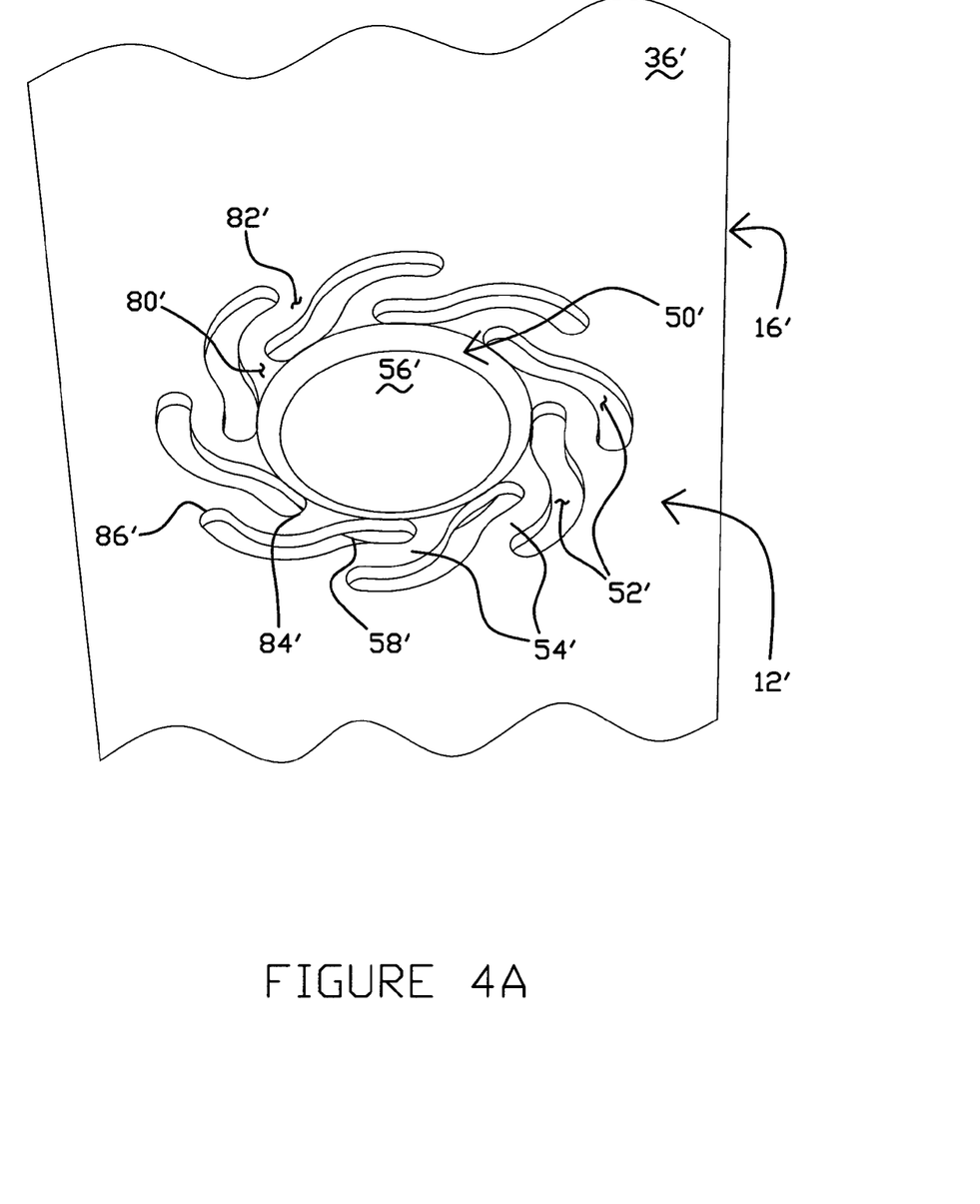
FIG. 4A is a fragmentary isometric view of a load beam having an offset structure in accordance with another embodiment of the invention.
Figure 4B:
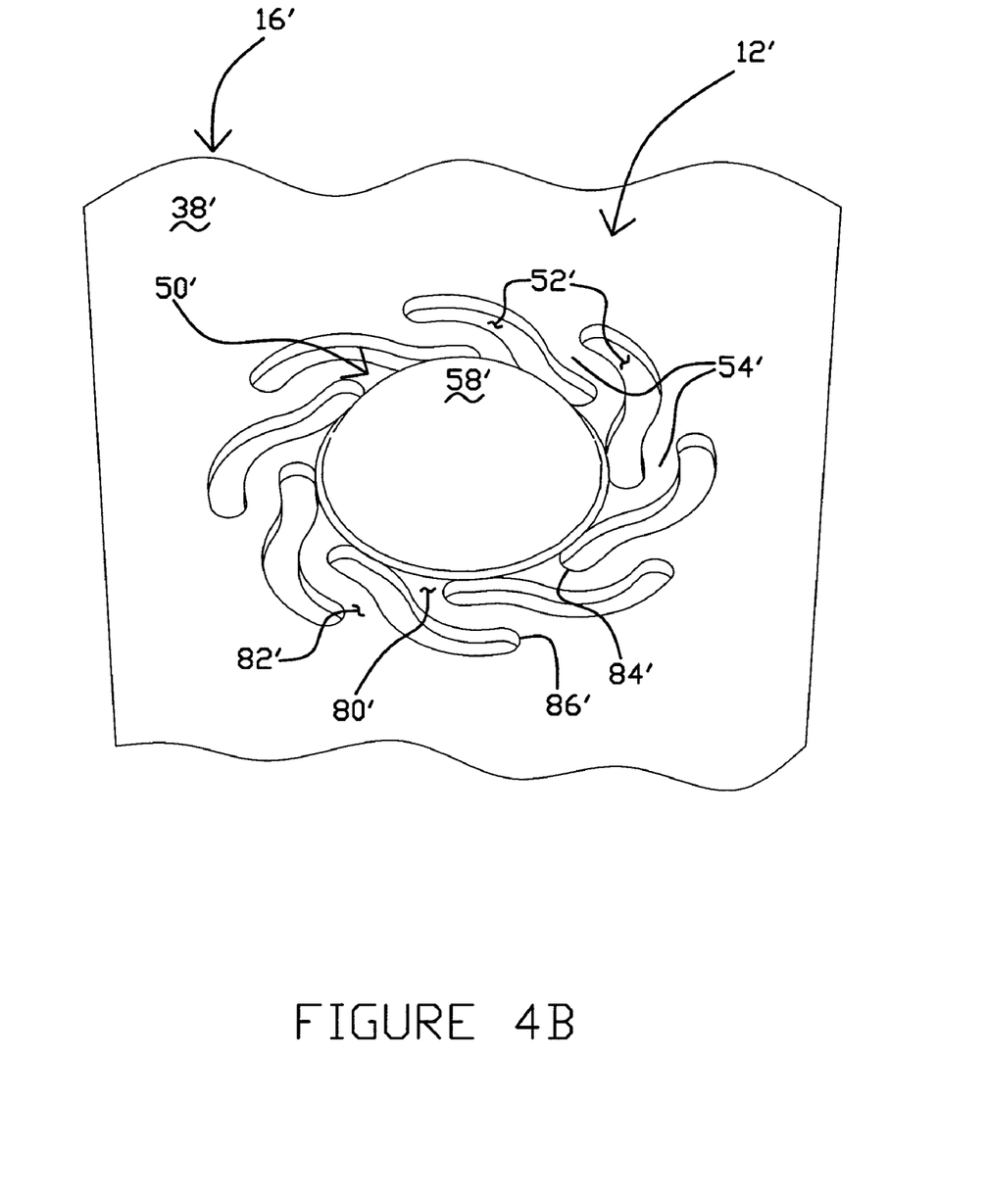
FIG. 4B is a fragmentary isometric view of the load beam of FIG. 4A, shown from the side of the load beam opposite the side shown in FIG. 4A.

Another embodiment of the invention, circular offset structure 12' is illustrated in FIGS. 4A and 4B. Voids 52' and links 54' are generally S-shaped and oriented at larger angles with respect to radial axes extending from the center of offset 50' than those of offset structure 12 described above. Other than these differences, offset structure 12' can be substantially the same or similar to offset structure 12, and similar features are identified by similar reference numbers in the drawings. Offset structure 12' can also be manufactured by processes described above in connection with offset structure 12.

Figure 5A:
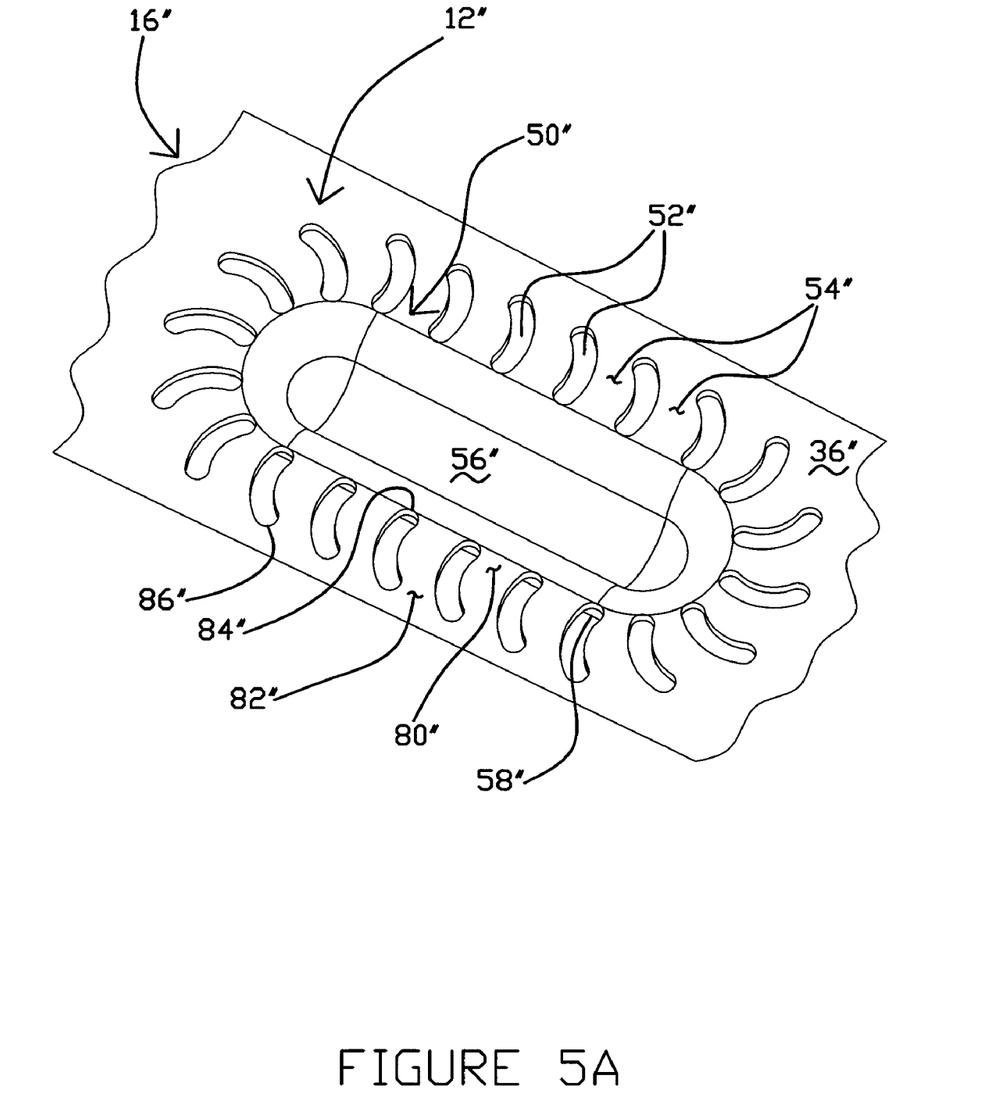
FIG. 5A is a fragmentary isometric view of a load beam having an offset structure in accordance with yet another embodiment of the invention.
Figure 5B:
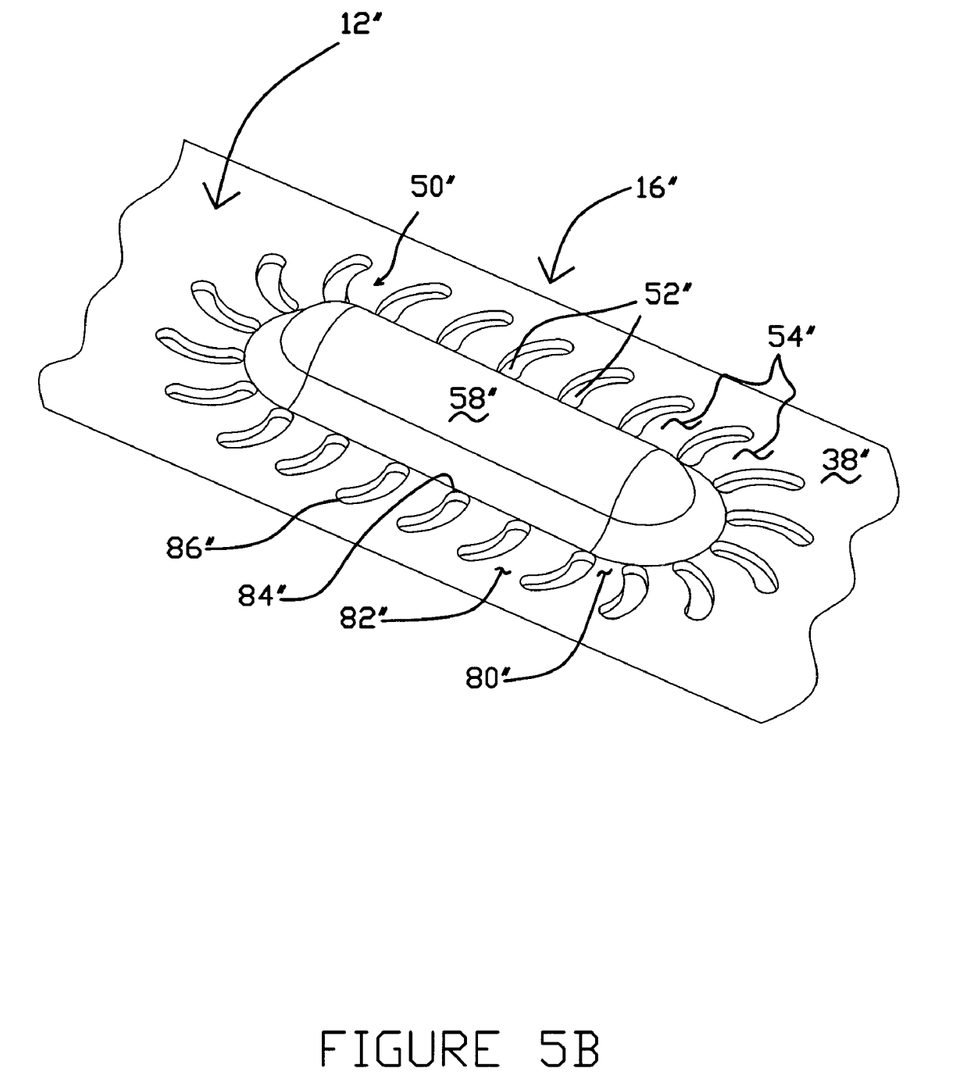
FIG. 5B is a fragmentary isometric view of the load beam shown in FIG. 5A, shown from the side of the load beam opposite the side shown in FIG. 5A.

FIGS. 5A and 5B illustrate a non-circular offset structure 12" in accordance with yet another embodiment of the invention. Although the non-circular offset structure 50" is shown as an elongated and generally oval-shaped structure on the rigid region 16" of suspension 10", alternate embodiments (not shown) have non-circular shaped offset structures, such as for example cone-shaped or pyramid-shaped, among others. Offset 50" can be used for purposes other than a load point on suspension 10" (e.g., in connection with head lift features). Other than these differences, offset structure 12" can be substantially the same or similar to offset structures 12 and 12', and similar features are identified by similar reference numbers in the drawings. Offset structure 12" can also be manufactured by processes described above in connection with offset structure 12.

The offset structures and manufacturing methods of the invention offer important advantages. Thinning and stretching of the material on and around an offset can be minimized, thereby enhancing the integrity of the structure. The offset structure can also be efficiently formed using conventional manufacturing processes.

Although the invention has been described with reference to certain embodiments, those skilled in the art will recognize that modifications can be made to the form and detail without departing from the spirit and scope of the invention.

What is claimed is:

1. A disk drive head suspension, comprising:
    a head suspension component having a surface and including an offset structure, the offset structure including:
        a formed offset extending out of a plane of the surface;
        a plurality of elongated links at spaced locations around the offset connecting the offset to the surface, the links extending between the offset and the surface in both radial and circumferential directions; and
        a plurality of elongated and generally S-shaped voids between the elongated links.

2. The disk drive head suspension of claim 1 wherein the voids have varying widths.

3. The disk drive head suspension of claim 1 wherein the voids are arranged in a pinwheel form.

4. The disk drive head suspension of claim 1 wherein the voids are non-intersecting.

5. The disk drive head suspension of claim 1 wherein the voids are non-linear.

6. The disk drive head suspension of claim 1 wherein at least portions of the voids have longitudinal axes that extend at an angle with respect to radial axes extending from a center of the offset.

7. The disk drive head suspension of claim 1 wherein:
    each link has a first end connected to the offset and a second end connected to the surface; and
    longitudinal axes through the first and second ends of each link are non-parallel.

8. The disk drive head suspension of claim 1 wherein the offset is a load point dimple.

9. The disk drive head suspension of claim 1 wherein the offset is circular.

10. The disk drive head suspension of claim 1 wherein the offset is non-circular.

11. The disk drive head suspension of claim 1 wherein the offset is elongated along a longitudinal axis of the head suspension or head suspension component.

12. The disk drive head suspension of claim 1 wherein at least a portion of the elongated links and the elongated voids extend out of the plane of the surface.

13. A disk drive head suspension, comprising:
a head suspension component having a surface and including an offset structure, the offset structure including:
a formed offset extending out of a plane of the surface;
a plurality of elongated links at spaced locations around the offset connecting the offset to the surface, the links extending between the offset and the surface in both radial and circumferential directions; and
a plurality of elongated voids between the elongated links arranged in a pinwheel form.

14. The disk drive head suspension of claim 13 wherein the voids have varying widths.

15. The disk drive head suspension of claim 13 wherein the voids are non-intersecting.

16. The disk drive head suspension of claim 13 wherein the voids are non-linear.

17. The disk drive head suspension of claim 13 wherein at least portions of the voids have longitudinal axes that extend at an angle with respect to radial axes extending from a center of the offset.

18. The disk drive head suspension of claim 13 wherein:
each link has a first end connected to the offset and a second end connected to the surface; and
longitudinal axes through the first and second ends of each link are non-parallel.

19. The disk drive head suspension of claim 13 wherein the offset is a load point dimple.

20. The disk drive head suspension of claim 13 wherein the offset is circular.

21. The disk drive head suspension of claim 13 wherein the offset is non-circular.

22. The disk drive head suspension of claim 13 wherein the offset is elongated along a longitudinal axis of the head suspension or head suspension component.

23. The disk drive head suspension of claim 13 wherein at least a portion of the elongated links and the elongated voids extend out of the plane of the surface.

24. A disk drive head suspension, comprising:
a head suspension component having a surface and including an offset structure, the offset structure including:
a formed offset extending out of a plane of the surface;
a plurality of elongated links at spaced locations around the offset connecting the offset to the surface, the links extending between the offset and the surface in both radial and circumferential directions;
a plurality of elongated voids between the elongated links; and
wherein at least a portion of the elongated links and the elongated voids extend out of the plane of the surface.

25. The disk drive head suspension of claim 24 wherein the voids have varying widths.

26. The disk drive head suspension of claim 24 wherein the voids are non-intersecting.

27. The disk drive head suspension of claim 24 wherein the voids are non-linear.

28. The disk drive head suspension of claim 24 wherein at least portions of the voids have longitudinal axes that extend at an angle with respect to radial axes extending from a center of the offset.

29. The disk drive head suspension of claim 24 wherein:
each link has a first end connected to the offset and a second end connected to the surface; and
longitudinal axes through the first and second ends of each link are non-parallel.

30. The disk drive head suspension of claim 24 wherein the offset is a load point dimple.

31. The disk drive head suspension of claim 24 wherein the offset is circular.

32. The disk drive head suspension of claim 24 wherein the offset is non-circular.

33. The disk drive head suspension of claim 24 wherein the offset is elongated along a longitudinal axis of the head suspension or head suspension component.

34. An offset structure for a disk drive head suspension or head suspension component having a surface, including:
a formed offset extending out of a plane of the surface;
a plurality of elongated links at spaced locations around the offset connecting the offset to the surface, the links extending between the offset and the surface in both radial and circumferential directions; and
a plurality of elongated and generally S-shaped voids between the elongated links, wherein the voids are arranged in a pinwheel form.

35. An offset structure for a disk drive head suspension or head suspension component having a surface, including:
a formed offset extending out of a plane of the surface;
a plurality of elongated links at spaced locations around the offset connecting the offset to the surface, the links extending between the offset and the surface in both radial and circumferential directions;
a plurality of elongated voids between the elongated links; and
wherein at least a portion of the elongated links and the elongated voids extend out of the plane of the surface, wherein each link has a first end connected to the offset and a second end connected to the surface, and wherein longitudinal axes through the first and second ends of each link are non-parallel.

\* \* \* \* \*